United States Patent
Lukens et al.

(10) Patent No.: US 11,848,843 B2
(45) Date of Patent: Dec. 19, 2023

(54) NETWORK ANOMALY DETECTION USING MACHINE LEARNING MODELS

(71) Applicant: T-Mobile Innovations LLC, Overland Park, KS (US)

(72) Inventors: Lance Paul Lukens, Templeton, CA (US); Hui-Lin Chang, Brambleton, VA (US); Shawn Derek Wallace, Charles Town, WV (US); Piradee Nganrungruang, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/646,215

(22) Filed: Dec. 28, 2021

(65) Prior Publication Data
US 2023/0216766 A1 Jul. 6, 2023

(51) Int. Cl.
*H04L 43/0823* (2022.01)
*H04L 43/0888* (2022.01)
(Continued)

(52) U.S. Cl.
CPC ......... *H04L 43/0823* (2013.01); *G06N 3/044* (2023.01); *G06N 3/045* (2023.01);
(Continued)

(58) Field of Classification Search
CPC . H04L 43/0823; H04L 43/0888; H04L 45/50; G06N 3/0445; G06N 3/0454; G06N 3/088
See application file for complete search history.

(56) References Cited

U.S. PATENT DOCUMENTS

| | | | |
|---|---|---|---|
| 2017/0279694 A1* | 9/2017 | Sartran | H04L 43/08 |
| 2018/0234302 A1* | 8/2018 | James | G06N 20/00 |

(Continued)

OTHER PUBLICATIONS

Larzalere, Brent, "LSTM Autoencoder for Anomaly Detection," Towards Data Science, Sep. 2019, <https://towardsdatascience.com/lstm-autoencoder-for-anomaly-detection-e1f4f2ee7ccf>, 13 pages.

(Continued)

*Primary Examiner* — Gil H. Lee
*Assistant Examiner* — Juan C Turriate Gastulo
(74) *Attorney, Agent, or Firm* — SHOOK, HARDY & BACON L.L.P.

(57) ABSTRACT

Anomalies in network traffic are detected using machine learning. A plurality of machine learning models is employed to determine whether there are anomalies in network traffic of an MPLS (Multiprotocol Label Switching) network that can affect the performance of devices in the network. A first machine learning model is trained on network traffic passed through network tunnels of a plurality of routers in the network. A second machine learning model is trained on router-specific network traffic passed through router-specific network traffic for a subset of the network tunnels associated with a particular router. The first machine learning model is employed to determine a network anomaly, and the second machine learning model is employed to determine a router-specific anomaly. A router error is identified when both a network anomaly and a router-specific anomaly are determined. An indication of the router error is communicated to a computing device.

20 Claims, 6 Drawing Sheets

(51) Int. Cl.
*H04L 45/50* (2022.01)
*G06N 3/088* (2023.01)
*G06N 3/044* (2023.01)
*G06N 3/045* (2023.01)

(52) U.S. Cl.
CPC ......... *G06N 3/088* (2013.01); *H04L 43/0888* (2013.01); *H04L 45/50* (2013.01)

(56) References Cited

U.S. PATENT DOCUMENTS

| | | | |
|---|---|---|---|
| 2021/0158260 A1* | 5/2021 | Kolar | G06Q 10/06393 |
| 2021/0160257 A1* | 5/2021 | Elyashiv | H04L 63/1425 |
| 2021/0304061 A1* | 9/2021 | Kolar | G06N 20/20 |
| 2022/0053010 A1* | 2/2022 | Elyashiv | G06N 3/088 |
| 2022/0366316 A1* | 11/2022 | Sharma | G06N 20/20 |

OTHER PUBLICATIONS

"Statsmodels v0.13.2," Statsmodels.org, <https://www.statsmodels.org/stable/generated/statsmodels.tsa.seasonal.seasonal_decompose.html>, 3 pages.

"MPLS WAN," NexGen Networks, <https://www.nexgen-net.com/services/mpls-wan.html>, 2 pages.

Olah, Christopher, "Understanding LSTM Networks," Colah's Blog, Aug. 2015, <http://colah.github.io/posts/2015-08-Understanding-LSTMs/>, 9 pages.

Thakur, Nitish Kumar, "Anomaly Detection in Python—Part 2; Multivariate Unsupervised Methods and Code," Towards Data Science, <https://towardsdatascience.com/anomaly-detection-in-python-part-2-multivariate-unsupervised-methods-and-code-b311a63f298b>, May 2021, 17 pages.

* cited by examiner

NETWORK ANOMALY DETECTION USING MACHINE LEARNING MODELS

CROSS-REFERENCE TO RELATED APPLICATIONS

This application relates to U.S. patent application Ser. No. 17/646,231, entitled "Seasonal Component Adjustment in Network Anomaly Detection," filed with the United States Patent and Trademark Office on Dec. 28, 2021. The contents of which are hereby expressly incorporated herein by reference it their entirety.

TECHNICAL FIELD

The technology relates to machine learning for anomaly detection in network traffic.

SUMMARY

At a high level, aspects described herein relate to identifying anomalies in network traffic using machine learning. Network traffic comprises communications passed over the network. In many networks, these communications are passed through network tunnels of a plurality of routers that direct the network traffic through the network. Anomalies within the network traffic could indicate a performance issue for devices using the network to communicate.

Anomalies may be detected using a plurality of machine learning models trained to determine whether there is an anomaly in network traffic across different parts of the network. A first machine learning model can be trained on historical network traffic passed through the network tunnels associated with the plurality of routers. The first machine learning model can then be employed to identify network anomalies in the network traffic. A second machine learning model is trained on historical router-specific network traffic passed through a subset of the network tunnels, where the subset of network tunnels is associated with a router of the plurality of routers. The second machine learning model can then be employed to determine a router-specific anomaly in the router-specific network traffic. LSTM autoencoder and isolation forest models are some of the models suitable for use as the machine learning models to determine the anomalies.

A router error is identified when both a network anomaly and a router-specific anomaly are determined. The router that is likely the cause of the router error is identified based on determining a router-specific anomaly in router-specific network traffic through the subset of network tunnels that is associated with the router. An indication of the router error can be communicated to a computing device that provides the indication via an output component so that remediation actions can be taken to correct the router error.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Throughout this disclosure, several acronyms and shorthand notations are used to aid in the understanding of certain concepts. These acronyms and shorthand notations are intended to help provide an easy methodology of communicating the ideas expressed herein, and are not meant to limit the scope of the present disclosure and technology. The following is a list of the acronyms:

| | |
|---|---|
| CDMA | Code Division Multiple Access |
| CER | Customer Edge Router |
| GPRS | General Packet Radio Service |
| GSM | Global System for Mobile Communications |
| LTE | Long Term Evolution |
| MPLS | Multiprotocol Label Switching |
| PCR | Provider Core Router |
| PER | Provider Edge Router |

Further, various technical terms are used throughout this description. An illustrative resource that describes these terms may be found in Newton's Telecom Dictionary, 27th Edition (2012).

Additionally, as used in this disclosure, a "network" generally refers to a system of communicatively coupled hardware devices. Communications across the network from one device to another are collectively referred to as "network traffic." One specific example network in which the described technology can be used is an MPLS network.

As also used in this disclosure, the term "router" comprises a device within the network configured to direct the communications of the network traffic along network tunnels. A "network tunnel" comprises a virtual path through which network traffic passes within the network. The network can be comprised of network tunnels associated with a plurality of the routers of the network, while a single router of the network can correspond with a subset of the network tunnels through which the router may receive or send communications of the network traffic.

A "mobile device," as used herein, is a device that has the capability of using a wireless communications network. A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, or LTE Advanced, among other technologies and standards.

Having identified some of the terminology, one example network anomaly detection system suitable for identifying anomalies is described. One network in which the present technology can be employed is an MPLS network. In general, many MPLS networks have a network of routers acting as switches to direct communications along network tunnels. The network traffic comprising the communications within the network can be monitored using standard techniques. For instance, the network traffic across the network can be monitored in terms of its throughput at various routers of the network. The throughput, along with other metrics, indicates the performance of the network, and ultimately, the ability for a mobile device and other devices to use the network to communicate.

When performance of the mobile devices or other devices communicating across the network is reduced, this is usually accompanied by a change in various network performance metrics, such as throughput. As such, it can be beneficial to monitor network performance metrics in an effort to detect anomalous events that might indicate performance degradation of devices communicating across the network, and then determine the cause or location of the detected anomalous events so that the cause can be corrected.

As will be described, methods of machine learning can be useful in determining anomalous events that could indicate poor network performance. One method uses multiple trained machine learning models to determine anomalous events at the network level and at the router level.

For instance, an MPLS network can include routers that direct network traffic over network tunnels. In such a network, a first machine learning model can be trained on historical network traffic that is passed through the network tunnels of the network. The first trained machine learning model can then be employed to detect network anomalies within the network traffic across the network tunnels of the routers in the network. Further, a second machine learning model can be trained on historical router-specific network traffic. The historical router-specific network traffic can include a portion of the historical network traffic that is specific to one router and a subset of the network tunnels that is associated with the router. A different machine learning model can be trained on historical router-specific network traffic for each router in the network. Each trained machine learning model can then be employed to determine router-specific anomalies within router-specific network traffic for each of the respective routers in the network.

When anomalies are determined in both the network traffic and the router-specific network traffic, it is likely there is an error that has reduced the performance of devices on the network. Thus, not only is an error identified based on the combination of the network anomaly and the router-specific anomaly, but the likely location of the error down to the specific router is also identified. In this case, the error is likely with the router associated with the router-specific anomaly. Once the router error is identified, an indication of the router error can be communicated to a computing device so that remediation actions can be taken to correct the router error.

One of the major benefits of this technique over conventional machine learning methods is that using multiple machine learning models in this way reduces the false positives for error identification in the network. That is, due to the nature of networks having routers for routing network traffic, if one router is experiencing a backlog, then another router might adjust the network traffic through different network tunnels or routers. Thus, one router might experience a router-specific anomaly, but due to the adjustment in network traffic, the overall network performance might be within acceptable limits. As such, devices on the network are likely not experiencing any performance issues. It is not only beneficial to determine when there is a router-specific anomaly, but to also indicate an error with the router where the error affects the overall performance of the network, in which case, device performance might be affected.

By using more than one model, where one model is trained on the network traffic across multiple routers and another model is trained on the router-specific network traffic, fewer false positives occur, and the accuracy of identifying errors in the network that degrade network performance of devices on the network is much higher. Because the network traffic is dynamic, it is less likely that an error is identified at a router when it does not affect overall network performance, since an error is indicated when there is both a network anomaly and a router-specific anomaly.

Moreover, this method has benefits over conventional methods because it allows for error detection down to the router level, however, without the high false-positive rate that would come from typical network traffic monitoring at this level. For instance, if network traffic were monitored at only the network level, then it is possible that errors affecting network performance would be identified with a fair degree of accuracy. Although more accurate, it would then be challenging to identify the precise cause of the network error. However, if only the router-specific network traffic for each router were monitored, then the dynamic nature of the network is likely to result in high false-positive rates. Instead, by determining that there is both a network anomaly and a router-specific anomaly using the machine learning models trained and employed as described, there is a high degree of confidence that there is a true router error when both the network anomaly and a router-specific anomaly are identified, while also identifying the router within the network that is likely responsible for the error.

It will be realized that the method previously described is only an example that can be practiced from the description that follows, and it is provided to more easily understand the technology and recognize its benefits. Additional examples are now described with reference to the figures.

Figure 1:
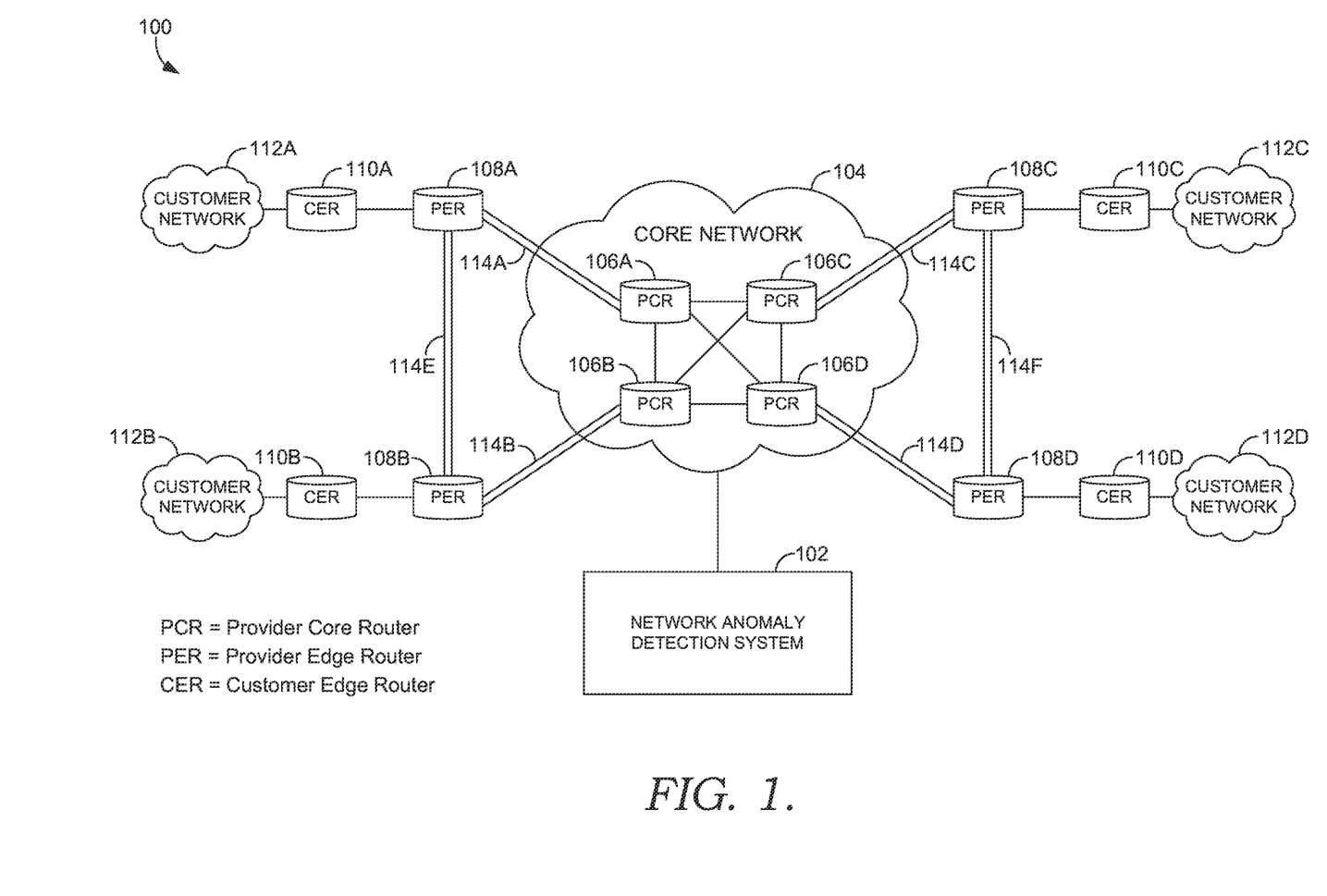
FIG. 1 is an example network in which an example network anomaly detection system is employed, in accordance with an aspect described herein.

Referring now to the drawings in general, and initially to FIG. 1, FIG. 1 provides an example network 100 in which an example network anomaly detection system 102 is employed. As illustrated, network 100 is an example of an MPLS network in which the technology can be used. It will be appreciated that this is just an example of an MPLS network that is suitable. The disclosed technology may also work with other MPLS networks that are in different arrangements or configurations, including those that have additional or fewer components. Moreover, there are other networks in which the described technology can be employed as well, and the intent is not to limit the technology only to MPLS networks. Instead, since it is impracticable to describe every network configuration in which the technology can be used, the MPLS network of FIG. 1 is given as an example to aid in describing the technology. Further, although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether.

Having this in mind, network 100, in which network anomaly detection system 102 is employed, comprises core network 104 of provider core routers 106A-106D. Provider core routers 106A-106D are shown in communication with one another in order to route network traffic. Network 100 further comprises provider edge routers 108A-108D, which are in communication with provider core routers 106A-106D to route network traffic within the network. Provider edge routers 108A-108D are in communication with customer edge routers 110A-110D, which respectively provide service to customer networks 112A-112D at which a mobile device or other device may be connected. In general, provider core routers 106A-106D, provider edge routers 108A-108D, and customer edge routers 110A-110D can comprise any hardware router, such as a label switching router, or any router that supports forwarding communication packets, including MPLS packets. Some networks may include both label switching routers for routing MPLS network traffic and non-MPLS routers. Provider core routers 106A-106D, provider edge routers 108A-108D, and customer edge routers 110A-110D are intended to represent any combination of routers.

In describing the technology, reference is made to "network routers." Broadly, network routers is a plurality of routers in the network. That is, network routers may include all of or a portion of the routers within a network. In the example provided by FIG. 1, "network routers" may refer to all of provider core routers 106A-106D, provider edge routers 108A-108D, and customer edge routers 110A-110D. In implementations, network routers can include a plurality of routers that is only a portion of the total number of routers in a network. In a specific case, "network routers" refers to a portion of the routers within the network that employs the same function that is distinguishable from functions performed by other routers in the network. Referencing again FIG. 1 as an example, the term "network routers" could include only provider core routers 106A-106D, which are part of core network 104.

Network 100 comprises network tunnels 114A-114F. Network traffic is passed through network tunnels 114A-114F as directed by routers, such as provider core routers 106A-106D or provider edge routers 108A-108D in the example provided by FIG. 1. It will be realized that a network may comprise various configurations of network tunnels and various types of network tunnels between any routers in the network. Network tunnels 114A-114F of network 100 are intended to be an illustrative aid for describing the technology.

Network anomaly detection system 102 communicates with network 100. In the illustrated example, network anomaly detection system 102 communicates with provider core routers 106A-106D of core network 104. In general, however, a network anomaly detection system, such as network anomaly detection system 102, may communicate with one or more routers in a network. Although network anomaly detection system 102 is shown as a single component, like other components of network 100, network anomaly detection system 102 may be distributed in nature, such that hardware employing functions of network anomaly detection system 102 may be in remote communication and be configured in any arrangement.

In general, network anomaly detection system 102 employs machine learning to monitor network traffic and detect anomalies that identify router errors. At a high level, network anomaly detection system 102 can employ multiple machine learning models to more accurately determine anomalies in the network traffic that affect devices, including mobile devices, communicating on network 100. That is, some implementations of network anomaly detection system 102 train and employ a machine learning model to determine network anomalies from network traffic across network tunnels corresponding to a plurality of routers, such as network tunnels 114A-114F and any plurality of routers, 106A-106D, 108A-108D, and 110A-110D. Additionally, network anomaly detection system 102 can train and employ other machine learning models to determine router-specific anomalies within router-specific network traffic across a subset of the network tunnels that respectively correspond to each of the routers. Network anomaly detection system 102 can indicate a router error when it identifies both a network anomaly and a router-specific anomaly. Further, network anomaly detection system 102 can identify a specific router associated with the router error by identifying which of the machine learning models monitoring router-specific network traffic has identified the router-specific anomaly. Upon identifying the router error, an indication of the router error can be communicated to a computing device, and the indication can identify the specific router associated with the router-specific anomaly.

Figure 2:
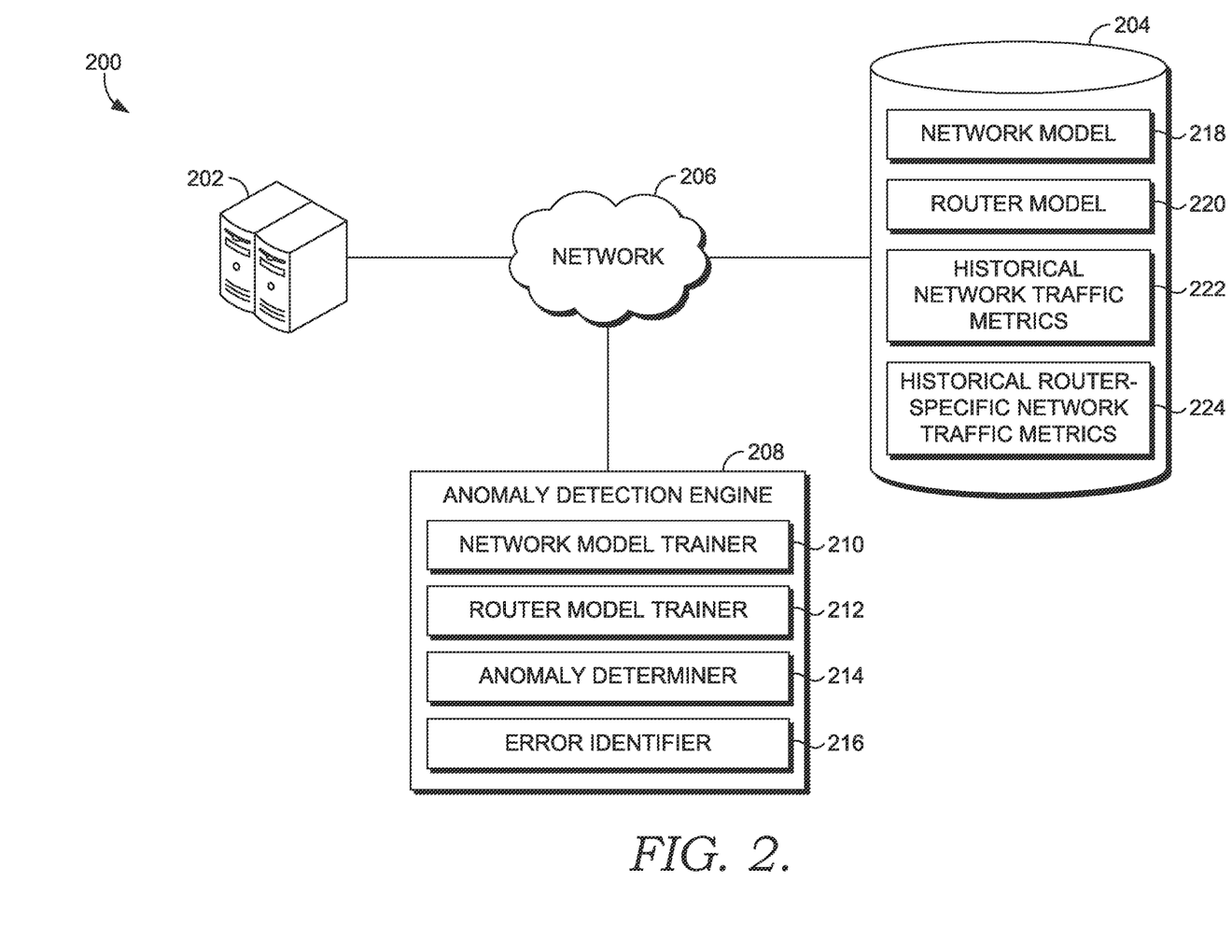
FIG. 2 is a network anomaly detection system suitable for use as the network anomaly detection system of claim 1, in accordance with an aspect described herein.

FIG. 2 illustrates network anomaly detection system 200, which is one example system suitable for use as network anomaly detection system 102 of FIG. 1 for identifying and communicating router errors using machine learning. In the example illustrated by FIG. 2, network anomaly detection system 200 comprises server 202 communicating with datastore 204 via network 206.

Server 202 represents one or more servers configured in any arrangement. Server 202 generally employs anomaly detection engine 208 to determine anomalies in network traffic that identify router errors. Server 202 may be any computing device. One example of a computing device suitable for use as server 202 is computing device 600 of FIG. 6.

Network 206 may include one or more networks (e.g., public network or virtual private network [VPN]), as shown with network 206. Network 206 may include, without limitation, one or more local area networks (LANs), wide area networks (WANs), or any other communication network or method.

Datastore 204 generally stores information including data, computer instructions (e.g., software program instructions, routines, or services), or models used in embodiments of the described technologies. Although depicted as a single database component, datastore 204 may be in the cloud or embodied as one or more data stores.

To determine anomalies and identify router errors, anomaly detection engine 208 employs network model trainer 210, router model trainer 212, anomaly determiner 214, and error identifier 216. Many of the elements described in relation to FIG. 2, such as those described in relation to anomaly detection engine 208, are functional entities that may be implemented as discrete or distributed components or in conjunction with other components, and in any suitable combination and location. Various functions described herein are being performed by one or more entities and may be carried out by hardware, firmware, or software. For instance, various functions may be carried out as a computerized method performed by one or more processors executing computer-executable instructions stored in memory.

In general, network model trainer 210 trains a machine learning model that identifies network anomalies in network traffic. As noted previously, a network may comprise a plurality of routers for routing network traffic through network tunnels of the network. Server 202 measures and stores various network metrics. Server 202 uses methods that will be understood by those of ordinary skill when measuring and storing network metrics. For instance, server 202 can be configured to measure any number of network metrics, such as throughput, bandwidth, router latency, peak gateway performance, among other metrics, within the network.

Server 202 stores a time series of the network metrics in datastore 204. The time series of network metrics can be indexed to identify network metrics associated with individual routers of the network. That is, the network metrics indicate performance of a plurality of routers and network tunnels within the network. Router-specific metrics, such as throughput or bandwidth for network tunnels associated with a specific router, or router latency or peak gateway performance, or any other metric attributed to the router, can be indexed in association with the specific router. In this way, server 202 can store the historical network metrics for the plurality of routers of the network as historical network traffic metrics 222, while historical router-specific metrics for each of the routers of the plurality of routers in the network can be stored as historical router-specific network traffic metrics 224. Server 202 can store a time series of network traffic metrics and router-specific network traffic metrics as historical network traffic metrics 222 and historical router-specific network traffic metrics 224, respectively, for any duration of time within datastore 204. Thus, in some embodiments, the historical router-specific network traffic metrics 224 for a router of the plurality of routers of the network forms a portion of the historical network traffic metrics 222.

Network model trainer 210 can train a machine learning model using historical network traffic metrics 222 as training data. The time series of historical network metrics within historical network traffic metrics 222 may be any duration of time. One example length of time for the time series that can be used in training the machine learning model is six months. The output of training the machine learning model using the historical network traffic metrics 222 is network model 218, which server 202 can store in datastore 204 for use by other components of anomaly detection engine 208. In implementations, network model 218 is referred to as a first machine learning model.

Various machine learning models may be suitable as network model 218. In general, a neural network may be effective for learning from the large amount of time series data included in historical network traffic metrics 222. Of the suitable neural networks, one specific example that has been found effective in implementations of the technology includes a recurrent neural network (RNN). In implementations, the RNN trained by network model trainer 210 is a long short-term memory (LSTM) model. Further, an LSTM autoencoder has been found particularly effective in handling the large amount of sequence data that is a result of monitoring network traffic across the network tunnels that are associated with the plurality of routers in the network. Other autoencoders may be suitable as well.

To give an example, an LSTM autoencoder can be trained by network model trainer 210, and the trained LSTM autoencoder can be stored as network model 218. The LSTM autoencoder is trained on historical network traffic metrics 222. The LSTM autoencoder uses historical network traffic metrics 222 as training inputs and uses an encoder to compress historical network traffic metrics 222 into a lower dimensional representation of historical network traffic metrics 222. The lower dimensional representation of historical network traffic metrics 222 is input into a decoder of the LSTM autoencoder to regenerate the input.

The error between the input historical network traffic metrics 222 and the regeneration by the decoder can be quantified as the mean error. When training the LSTM autoencoder, the mean error is provided as the loss function, which is reduced during training. The mean error may include a mean absolute error (MAE), root mean squared error (RMSE), mean absolute percentage error (MAPE), mean squared error (MSE), and the like. MAE has been found particularly suitable since some other models apply higher weights to data that have higher errors. In some aspects, since the ultimate determination made using network model 218 is binary, whether there is an anomaly present in the input data determined from across the network, the MAE can give an accurate representation of an anomaly that affects network devices without the sensitivity to the degree of error in the input data. With this in mind, it will still be recognized that other mean error methods may be employed. Once trained, the LSTM autoencoder (or any other trained model) can be stored as network model 218.

In implementations of the technology, network model trainer 210 trains a machine learning model as network model 218 on a continuous basis. That is, network model trainer 210 uses a time series of historical network traffic metrics 222 over a defined period of time when training the machine learning model. As an example, this could be the time series for the previous six months. Any period of time can be defined. Network model trainer 210 trains the machine learning model continuously by training the model at defined-time increments, such as a week, month, year, and so forth. For instance, network model trainer 210 may train the model each week using a six-month time series of data. By training the model on a continuous basis, implementations of the technology are able to account for changes to the network, such as steady trends in network traffic changes, more or fewer routers, changes to network tunnels, or the like.

Router model trainer 212 generally trains a machine learning model that identifies router-specific anomalies in router-specific network traffic. As noted, router-specific network traffic can be associated with a subset of the network tunnels of the network. Thus, a router-specific anomaly may occur within router-specific network traffic through the subset of network tunnels that is associated with a router. The subset of network tunnels is a set of network tunnels that is less than a total number of network tunnels.

Router model trainer 212 may train a plurality of machine learning models. Each of the machine learning models can be associated with a router to identify router-specific anomalies within router-specific network traffic passed through the subset of network tunnels corresponding to the router. In implementations, a machine learning model of the plurality of machine learning models trained by router model trainer 212 is referred to as a second machine learning model. One or more of the machine learning models trained by router model trainer 212 is stored as router model 220 for use by components of anomaly detection engine 208.

Router model trainer 212 can use historical router-specific network traffic metrics 224 for a router to train the machine learning model associated with the router. The time series of historical router-specific network traffic metrics 224 used in the training can be any duration of time. One example length of time for the time series is six months.

Various machine learning models may be suitable as router model 220. A neural network can also be effectively trained on the time series data included in historical router-specific network traffic metrics 224. One specific example that has been found effective in implementations of the technology incudes an RNN. In implementations, the RNN trained by router model trainer 212 is an LSTM model. Similarly, an LSTM autoencoder is particularly effective for use with the time series data of historical router-specific network traffic metrics 224. Other autoencoders may be suitable as well.

Router model trainer 212 may train an LSTM autoencoder in a matter similar to the training described with respect to network model trainer 210. This can include a continuous training of the machine learning model by router model trainer 212. That is, historical router-specific network traffic metrics 224 can be input as training data into the LSTM autoencoder, such that the LSTM autoencoder compresses historical router-specific network traffic metrics 224 into a lower dimensional representation, which is then regenerated. The mean error is measured and minimized as the loss function. The trained LSTM autoencoder can be stored as router model 220. In implementations, router model trainer 212 trains a machine learning model, such as the LSTM autoencoder, for each router of a plurality of routers in the network based on each router's respective historical router-specific network traffic provided by historical router-specific network traffic metrics 224.

In another example, router model trainer 212 may train an isolation forest model as router model 220 to identify anomalies in router-specific network traffic. In doing so, router model trainer 212 constructs isolation trees by recursive, random partitioning of the historical router-specific network traffic metrics 224 for each of the routers in the plurality of routers of the network. From the constructed trees, router model trainer 212 determines an anomaly score. The anomaly score may be a non-linear function of the average path length over all of the isolation trees. The anomaly score can be included in router model 220 stored on datastore 204, and can be used by other components of anomaly detection engine 208.

Anomaly detection engine 208 can employ anomaly determiner 214 to determine anomalies in the network. In general, anomaly determiner 214 determines anomalies using a plurality of machine learning models. This can include using network model 218 and router model 220.

Anomaly determiner 214 can determine if there is a network anomaly using network model 218. Anomaly detection engine 208 receives network traffic across network tunnels associated with a plurality of routers in the network. Anomaly determiner 214 provides the network traffic (e.g., the metrics of the network traffic, such as throughput, bandwidth, and so forth) as inputs to network model 218. In response, network model 218 outputs a mean error, which can indicate a deviation in the network traffic from the mean error predicted by network model 218 based on the training.

To determine whether there is an anomaly in the network traffic, the mean error determined during the training can be used as a mean error threshold value and compared to the mean error determined as the output of network model 218 from an input of the network traffic. If the output mean error exceeds the mean error threshold value, either high or low, then anomaly determiner 214 may determine that there is an anomaly in the network traffic. In some cases, it is beneficial to determine whether a network anomaly exists based on the difference between the output mean error and the mean error threshold value, and how likely this difference is to occur. This can be done by determining the standard deviation between the output mean error and the mean error threshold value. Anomaly determiner 214 may determine that there is a network anomaly if the difference is a predefined standard deviation, such as two or more standard deviations, or in another case, three or more standard deviations. It will be realized that any number of standard deviations may be used to determine whether there is an anomaly in the network traffic.

Anomaly determiner 214 may determine whether there is a router-specific anomaly within the router-specific network traffic for any of the routers in the plurality of routers of the network. To do so, anomaly determiner 214 may employ router model 220. As noted, router model 220 may comprise one or more router models, each associated with a respective router of the plurality. Anomaly detection engine 208 receives router-specific network traffic associated with each of the routers. Anomaly determiner 214 provides the router-specific network traffic to router model 220 as an input to determine whether there is a router-specific anomaly.

As noted, various machine learning algorithms may be used as router model 220. In cases where router model 220 comprises a trained LSTM autoencoder, the output of the LSTM autoencoder is a mean error. The output mean error is compared to a mean error threshold value for the router-specific network traffic to determine whether there is a router-specific anomaly. The mean error threshold value can be the mean error determined when training the machine learning model as router model 220. Anomaly determiner 214 can determine if there is a router-specific anomaly in the router-specific network traffic if the output mean error of router model 220 exceeds, either high or low, the mean error threshold value for the router-specific network traffic determined from the mean error of the training. Similarly, it may be beneficial to determine whether a router-specific network anomaly exists based on the difference between the output mean error and the mean error threshold value, and how likely this difference is to occur. This can be done by determining the standard deviation between the output mean error and the mean error threshold value. Anomaly determiner 214 may determine that there is a router-specific anomaly if the difference is a predefined standard deviation, such as two or more standard deviations, or, in another case, three or more standard deviations. It will be realized that any number of standard deviations may be used to determine whether there is a router-specific anomaly in the router-specific network traffic.

In cases where router model 220 comprises an isolation forest model, anomaly determiner 214 can determine whether there is a router-specific anomaly in the router-specific network traffic by using the anomaly score determined during the training as a contamination threshold. For instance, anomaly determiner 214 generates isolation trees from the router-specific network traffic received by anomaly detection engine 208. From the isolation trees, anomaly determiner 214 determines an anomaly score of the router-specific network traffic.

The anomaly score is compared to the contamination threshold to determine whether there is a router-specific anomaly. In some cases, if the anomaly score of the router-specific network traffic exceeds, either high or low, the contamination threshold, anomaly determiner 214 determines there is a network-specific anomaly. When determining whether the anomaly score exceeds the contamination threshold, anomaly determiner 214 can determine the difference between the anomaly score and the contamination threshold, and how likely the distance is to occur. For instance, anomaly determiner 214 may determine there is a router-specific anomaly when the anomaly score exceeds the contamination threshold by a predetermined standard deviation, such as two or more standard deviations, on in another case, three or more standard deviations. It will be realized that any standard deviation can be used when determining a router-specific anomaly.

Error identifier 216 generally identifies an error in the network based on anomalies determined by anomaly determiner 214. In particular, error identifier 216 can determine a router error specific to a particular router of the network. Error identifier 216 can determine that there is an error in the network when anomaly determiner 214 determines a network anomaly in the network traffic of a plurality of routers of the network routers, and when anomaly determiner 214 determines that there is at least one router-specific anomaly in router-specific network traffic for at least one of the routers of the plurality of routers. The error in the network can be further narrowed down to a particular router error by identifying the router associated with the router-specific anomaly. For instance, this may be done by identifying the subset of network tunnels associated with the router-specific network traffic and determining which of the routers is associated with the identified subset of network tunnels. By identifying an error based on a network anomaly in the network traffic and the router-specific anomaly in the router-specific network traffic, anomaly detection engine 208 has a high level of confidence that the error is not a false positive, and, additionally, can narrow the error down to a particular router, thus making remediation actions to resolve the issue easier.

Figure 3:
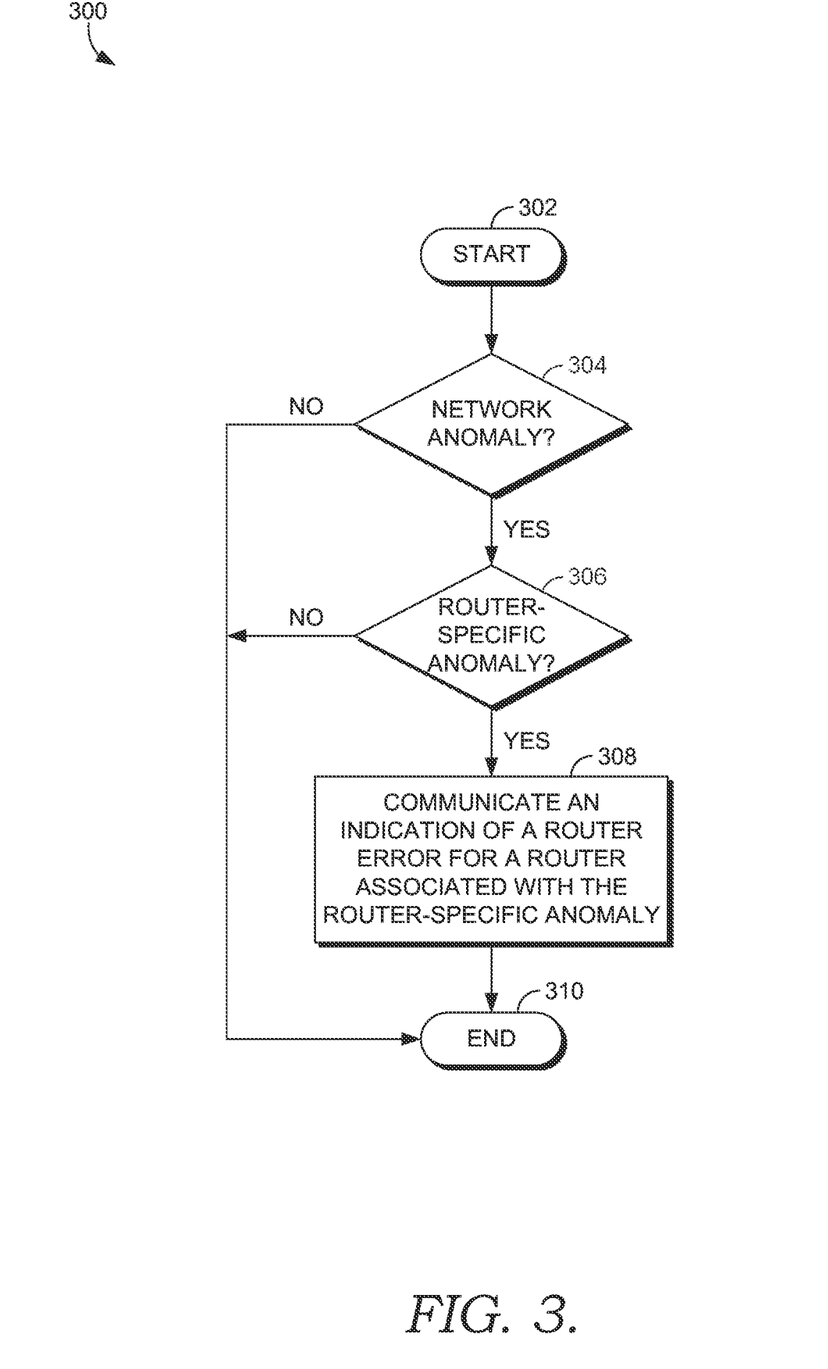
FIG. 3 is an example decision flowchart for identifying and communicating a router error, which can be implemented using the network anomaly detection system of FIG. 2, in accordance with an aspect described herein.

FIG. 3 provides an example decision flowchart for a process 300 of identifying and communicating a router error, which can be implemented by anomaly detection engine 208 of network anomaly detection system 200 of FIG. 2. At step 302, anomaly detection engine 208 starts process 300 for identifying and communicating a router error. Process 300 proceeds to step 304, where anomaly determiner 214 determines whether there is a network error in the network traffic by employing network model 218. If anomaly determiner 214 does not determine a network error, process 300 proceeds to step 310 and ends. If anomaly determiner 214 does determine a network error, process 300 continues to step 306, where anomaly determiner 214 determines whether there is a router-specific network error. If anomaly determiner 214 does not determine a router-specific network error, process 300 proceeds to step 310 and ends. If anomaly determiner 214 does determine a router-specific network error, process 300 proceeds to step 308. At step 308, anomaly detection engine 208 communicates an indication of a router error. The router error can be identified using error identifier 216 by identifying the router in the network that is associated with the router-specific network error. The indication may be communicated by anomaly detection engine 208 to a computing device. After communicating the indication, process 300 may proceed to step 310 and end. It will be appreciated that process 300 is only an example, and others can be employed.

Figure 4:
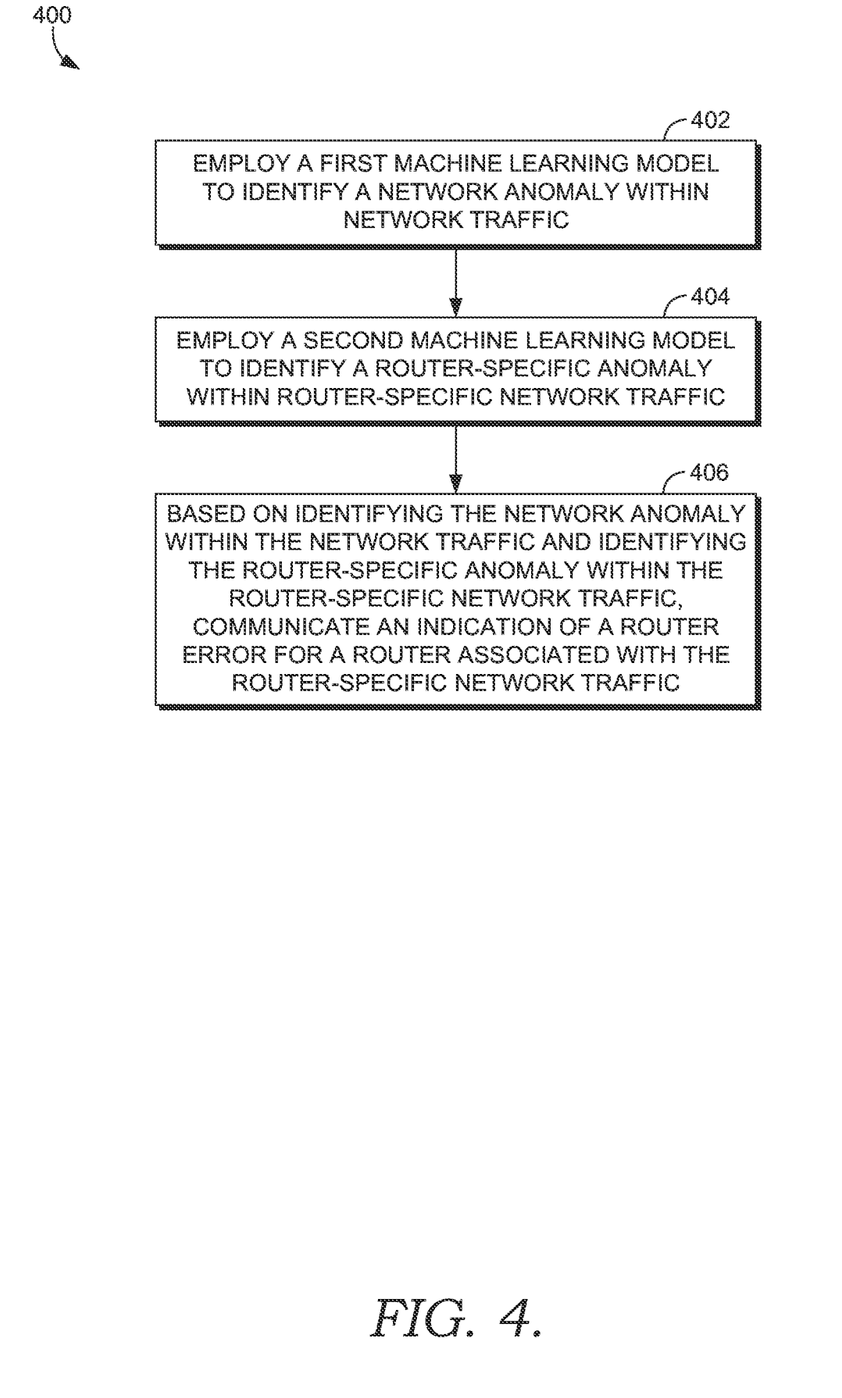
FIG. 4 is a flow diagram illustrating an example method for communicating an indication of a router error, in accordance with an aspect described herein.
Figure 5:
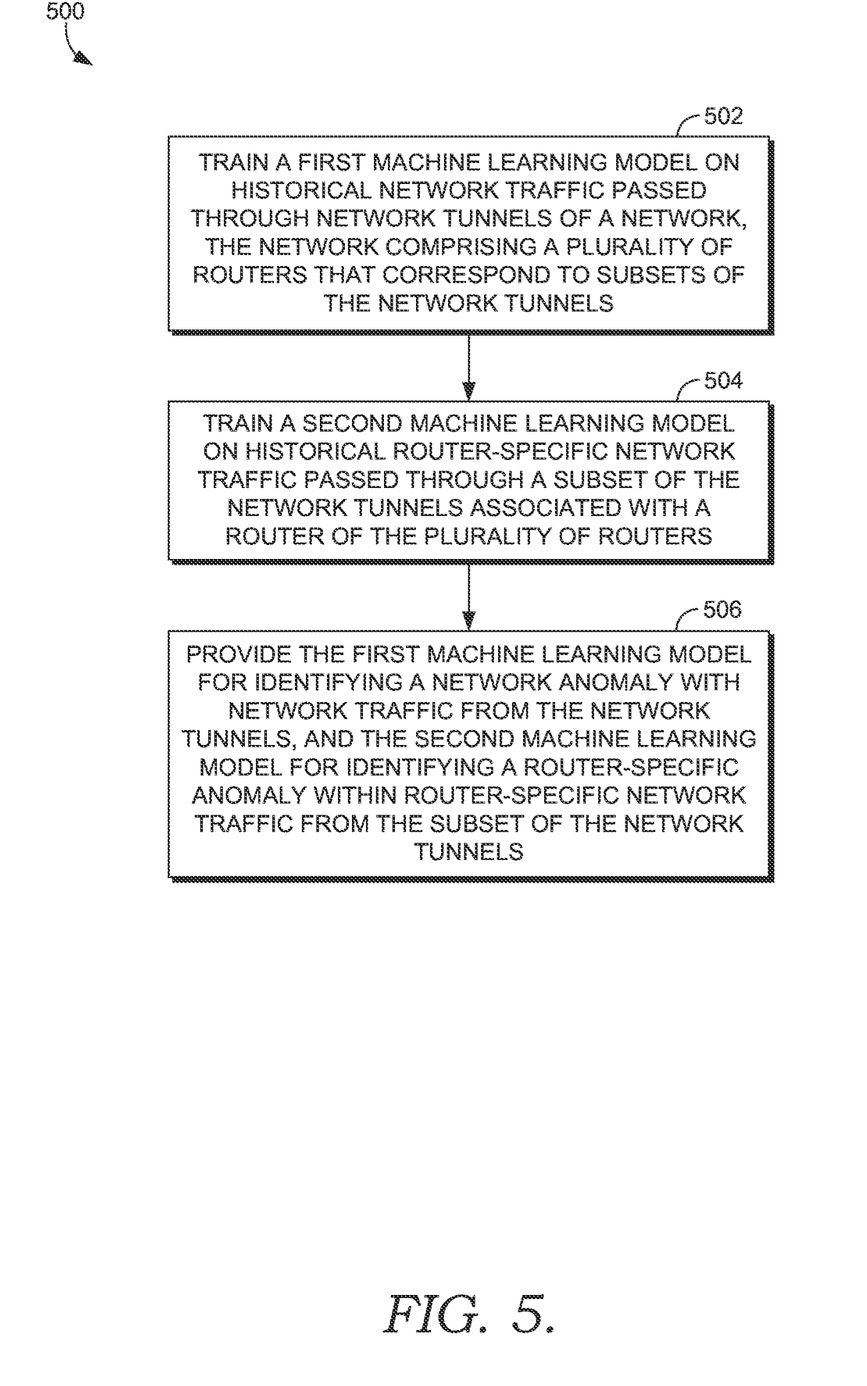
FIG. 5 is another flow diagram illustrating an example method for training and providing machine learning models suitable for identifying network anomalies and router-specific anomalies, in accordance with an aspect described herein.

With reference now to FIGS. 4 and 5, flow diagrams are provided illustrating methods 400 and 500 for anomaly detection. Each block of methods 400 and 500 comprises a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. Methods 400 or 500 may be implemented by network anomaly detection system 200 of FIG. 2.

Turning initially to FIG. 4, FIG. 4 illustrates a flow diagram of example method 400 for anomaly detection. At block 402, a first machine learning model is employed to determine whether there is a network anomaly within network traffic. Anomaly determiner 214 of anomaly detection engine 208 can be used to determine whether there is a network anomaly in the network traffic. The network traffic can comprise communications passed through network tunnels that are associated with a plurality of routers of a network. The network anomaly is determined by anomaly determiner 214 by inputting the network traffic (e.g., network traffic metrics) into the first machine learning model that has been trained on historical network traffic metrics, such as historical network traffic metrics 222. Network model 218 is an example of a trained machine learning model suitable for use as the first machine learning model. In some cases, the first machine learning model is a trained LSTM autoencoder.

At block 404, a second machine learning model is employed to determine whether there is a router-specific anomaly within router-specific network traffic. Anomaly determiner 214 of anomaly detection engine 208 can be used to determine whether there is a router-specific anomaly in the router-specific network traffic. Router-specific network traffic may comprise communications passed through a subset of the network tunnels. The subset of network tunnels can comprise those network tunnels of the network that are associated with a specific router of the plurality of routers. The router-specific anomaly is determined by anomaly determiner 214 using the router-specific network traffic (e.g., router-specific network traffic metrics) as an input to the second machine learning model, which has been trained on historical router-specific network traffic metrics, such as historical router-specific network traffic metrics 224. Router model 220 is an example of a trained machine learning model that can be used as the second machine learning model. In some cases, the trained second machine learning model is an LSTM autoencoder or an isolation forest model.

At block 406, an indication of a router error is communicated. The indication can be communicated to a computing device to provide via an output component of the computing device. The router error may be identified using error identifier 216 of anomaly detection engine 208. The communication may be in response to determining there is both a network anomaly at block 402 and a router-specific anomaly at block 404. The router error can be identified by error identifier 216 based on the determination of the router-specific anomaly within router-specific network traffic passed through the subset of network tunnels that is associated with the router of the plurality of routers of the network.

Turning now to FIG. 5, another flow diagram of example method 500 for anomaly detection is provided. At block 502, a first machine learning model is trained. Network model trainer 210 is suitable for training the first machine learning model. The first machine learning model can be trained by network model trainer 210 using historical network traffic metrics 222 passed through network tunnels associated with a plurality of routers of the network. Subsets of the network tunnels can respectively correspond to each router of the plurality of routers. Network model 218 is an example of the trained first machine learning model. In some aspects, the trained first machine learning model is an LSTM autoencoder.

At block 504, a second machine learning model is trained. Router model trainer 212 is suitable for training the second machine learning model. Router model trainer 212 can train the second machine learning model using historical router-specific network traffic metrics, such as historical router-specific network traffic metrics 224. The historical router-specific network traffic metrics can comprise a portion of the network traffic associated with a subset of network tunnels for a specific router of the plurality of routers. Router model 220 is an example of the trained second machine learning model. In some cases, the trained second machine learning model is an LSTM autoencoder. In some cases, the trained machine learning model is an isolation forest model.

Figure 6:
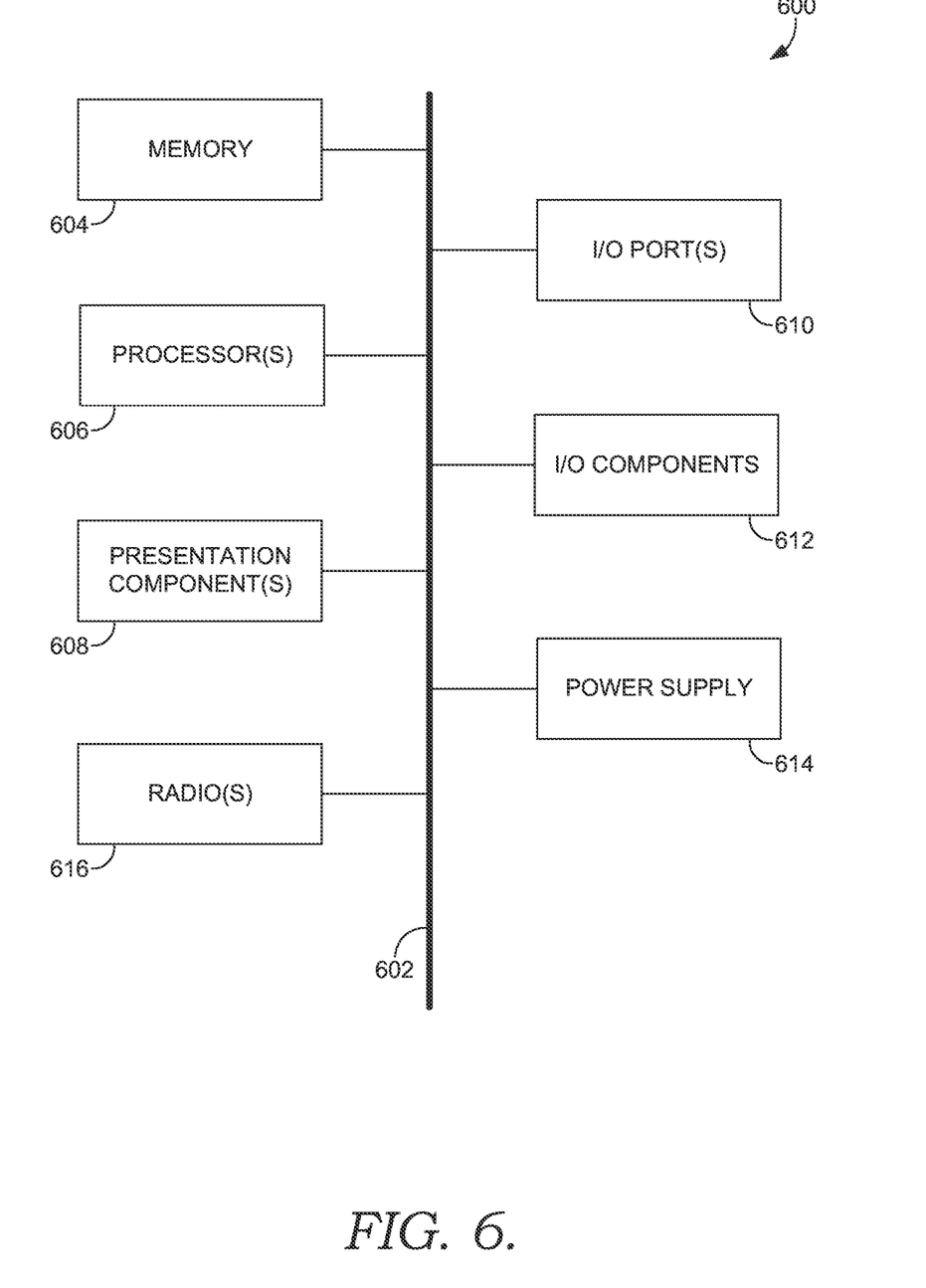
FIG. 6 is an example computing device suitable for implementing the described technology, in accordance with an embodiment described herein.

At block 506, the first machine learning model and the second machine learning model are provided for determining anomalies. The first machine learning model, having been trained at block 502, may be provided such that it can be employed to identify network anomalies in the network traffic. The second machine learning model, having been trained at block 504, may be provided such that it can be employed to identify router-specific anomalies within router-specific network traffic passed through a subset of router tunnels associated with the router. The first and second machine learning models can be provided to one or more computing devices, such as computing device 600, suitable for employing the machine learning models to determine anomalies.

With reference to FIG. 6, computing device 600 includes a bus 602 that directly or indirectly couples the following devices: memory 604, one or more processors 606, one or more presentation components 608, input/output (I/O) ports 610, input/output (I/O) components 612, and an illustrative power supply 614. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 6 is merely illustrative of an example computing device that can be used in connection with one or more embodiments of the present technology. Distinction is not made between such categories as "workstation," "server," "laptop," "handheld device," etc., as all are contemplated within the scope of FIG. 6 with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and that can be accessed by computing device 600. In contrast to communication media, computer storage media is not a modulated data signal or any signal per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 604 or I/O components 612. Presentation component(s) 608 present data indications to a user or other device. Example presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, W-CDMA, EDGE, CDMA2000, and the like. Radio 616 might additionally or alternatively facilitate other types of wireless communications including Wi-Fi, WiMAX, LTE, 5G, or other VoIP communications. As can be appreciated, in various embodiments, radio 616 can be configured to support multiple technologies, or, multiple radios can be utilized to support multiple technologies.

For purposes of this disclosure, the words "including," "having," or a variation thereof, have the same broad meaning as the word "comprising," and the word "accessing" comprises "receiving," "referencing," or "retrieving." Further, the word "communicating" has the same broad meaning as the word "receiving" or "transmitting," as facilitated by software or hardware-based buses, receivers, or transmitters using communication media. Also, the word "initiating" has the same broad meaning as the word "executing or "instructing," where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Further-more, the term "or" includes the conjunctive, the disjunctive, and both (a or b thus includes either a or b, as well as a and b).

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A computerized method for anomaly detection performed by one or more processors, the method comprising:
    employing a first machine learning model to determine a network anomaly within network traffic, the first machine learning model identifying the network anomaly in response to a first input of the network traffic from network tunnels through which the network traffic passes;
    employing a second machine learning model to determine a router-specific anomaly within router-specific network traffic from a subset of the network tunnels through which the router-specific network traffic passes, the second machine learning model identifying the router-specific anomaly in response to a second input of a portion of the network traffic from the subset of network tunnels through which the router-specific network traffic passes, the second machine learning model included within a plurality of machine learning models that are each trained on router-specific network traffic corresponding to different subsets of the network tunnels;
    based on determining the network anomaly within the network traffic and the second machine learning model of the plurality determining the router-specific anomaly within the router-specific network traffic, identifying a router associated with the router-specific network traffic and the corresponding subset of network tunnels from among the different network tunnels as experiencing a router error; and
    communicating an indication of the router error based on the identification of the router.

2. The method of claim 1, wherein the first machine learning model or the second machine learning model is a long short-term memory (LSTM) autoencoder.

3. The method of claim 1, wherein the second machine learning model is an isolation forest model.

4. The method of claim 1, wherein the network traffic is Multiprotocol Label Switching (MPLS) traffic.

5. The method of claim 1, wherein the network traffic is associated with a network comprising a plurality of routers that includes the router, the first machine learning model having been trained on historical network traffic from the network tunnels corresponding to the plurality of routers, and the second machine learning model having been trained on a portion of the historical network traffic specific to only the subset of the network tunnels corresponding to the router.

6. The method of claim 1, wherein the first machine learning model determines the network anomaly based on comparing a mean error output of the first machine learning model to a mean error threshold value.

7. The method of claim 1, wherein the second machine learning model is employed in response to the first machine learning model determining the network anomaly.

8. One or more computer storage media storing computer-readable instructions that when executed by a processor, cause the processor to perform operations of anomaly detection, the operations comprising:
    training a first machine learning model on historical network traffic passed through network tunnels of a network, the network comprising a plurality of routers that correspond to subsets of the network tunnels;
    training a plurality of machine learning models on router-specific network traffic, each machine learning model of the plurality trained on router-specific network traffic corresponding to different subsets of the network tunnels, the plurality of machine learning models comprising a second machine learning model trained on historical router-specific network traffic passed through a subset of the network tunnels associated with a router of the plurality of routers; and
    providing the first machine learning model for determining a network anomaly within network traffic from the network tunnels, and the second machine learning model for determining a router-specific anomaly within router-specific network traffic from the subset of the network tunnels corresponding to the second machine learning model, wherein determining the router-specific anomaly by the second machine learning model identifies the router corresponding to the second machine learning model as experiencing a router error.

9. The media of claim 8, wherein the first machine learning model or the second machine learning model is a long short-term memory (LSTM) autoencoder.

10. The media of claim 8, wherein the second machine learning model is an isolation forest model.

11. The media of claim 8, wherein the network traffic is Multiprotocol Label Switching (MPLS) traffic.

12. The media of claim 8, wherein the historical network traffic comprises a first time series of throughput measurements for each of the network tunnels, and wherein the historical router-specific network traffic comprises a second time series of throughput measurements for only the subset of the network tunnels associated with the router.

13. The media of claim 8, wherein a loss function utilized when training the first machine learning model or the second machine learning model is mean error.

14. A system for anomaly detection, the system comprising:
    a plurality of routers within a network, the plurality of routers directing network traffic passed through network tunnels, wherein each router of the plurality directs router-specific network traffic passed through a subset of the network tunnels;

at least one processor; and one or more computer storage media storing computer-readable instructions that when executed by the at least one processor, cause the at least one processor to:

employ a first machine learning model to determine a network anomaly within the network traffic, the first machine learning model receiving the network traffic as a first input;

employ a plurality of machine learning models on the router-specific network traffic, each machine learning model employed on router-specific network traffic corresponding to different subsets of the network tunnels, wherein a second machine learning model, within the plurality of machine learning models, determines a router-specific anomaly within the router-specific network traffic for a router of the plurality of routers, the second machine learning model receiving a portion of the network traffic from the corresponding subset of network tunnels as a second input;

based on determining a network anomaly within the network traffic and determining the router-specific anomaly in the router-specific network traffic by the second machine learning model, identifying the router corresponding to the second machine learning model as experiencing a router error; and communicate an indication of the router error associated with the router.

15. The system of claim 14, wherein the computer storage media further causes the at least one processor to:

train the first machine learning model on historical network traffic passed through the network tunnels of the network; and train the second machine learning model on historical router-specific network traffic passed through the subset of the network tunnels associated with the router.

16. The system of claim 15, wherein the historical network traffic comprises a first time series of throughput measurements for each of the network tunnels, and wherein the historical router-specific network traffic comprises a second time series of throughput measurements for only the subset of the network tunnels associated with the router.

17. The system of claim 15, wherein a loss function utilized when training the first machine learning model or the second machine learning model is mean error.

18. The system of claim 14, wherein the first machine learning model or the second machine learning model is a long short-term memory (LSTM) autoencoder.

19. The system of claim 14, wherein the second machine learning model is an isolation forest model.

20. The system of claim 14, wherein the network traffic is Multiprotocol Label Switching (MPLS) traffic.

\* \* \* \* \*